April 26, 1927.

E. A. JEANNOTTE 1,626,281

PASSING LIGHT

Filed Jan. 28, 1926

Inventor
E. A. Jeannotte
By E. J. Featherstonhaugh
Attorney

Patented Apr. 26, 1927.

1,626,281

UNITED STATES PATENT OFFICE.

EMILE ALEXANDRE JEANNOTTE, OF MONTREAL, QUEBEC, CANADA.

PASSING LIGHT.

Application filed January 28, 1926. Serial No. 84,408.

The invention relates to a passing light, as described in the present specification and illustrated in the accompanying drawings that form part of the same.

The invention consists essentially of the novel features of construction pointed out broadly and specifically in the claims for novelty following a description containing an explanation in detail of an acceptable form of the invention.

The objects of the invention are to avoid the disastrous and calamitous results from collisions of motor driven vehicles on the highways; to facilitate the management of a motor car on dark nights and insure safety at high speed; to illumine that part of the road and the vehicle that comes within the vision of the approaching vehicle and thereby proving a factor of safety for the passing of both vehicles, whether similarly equipped or not; to enjoy to the utmost the benefits arising from the use of this invention in touring and enable the motorist to utilize the evening hours to continue the journey, which otherwise might be lost in idleness; to save the lives of the passengers and property losses; and generally to provide a reliable and efficient means for lighting the road and car where most needed.

In the drawings; Figure 1 is a perspective view, showing a motor car having the light mounted thereon.

Like numerals of reference indicate corresponding parts in the various figures.

Figure 1:
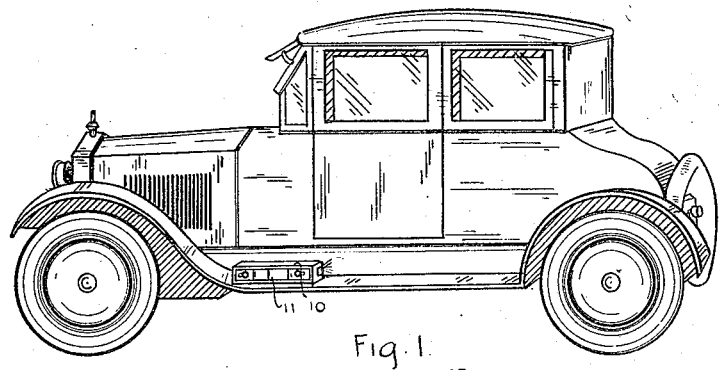
Figure 2:
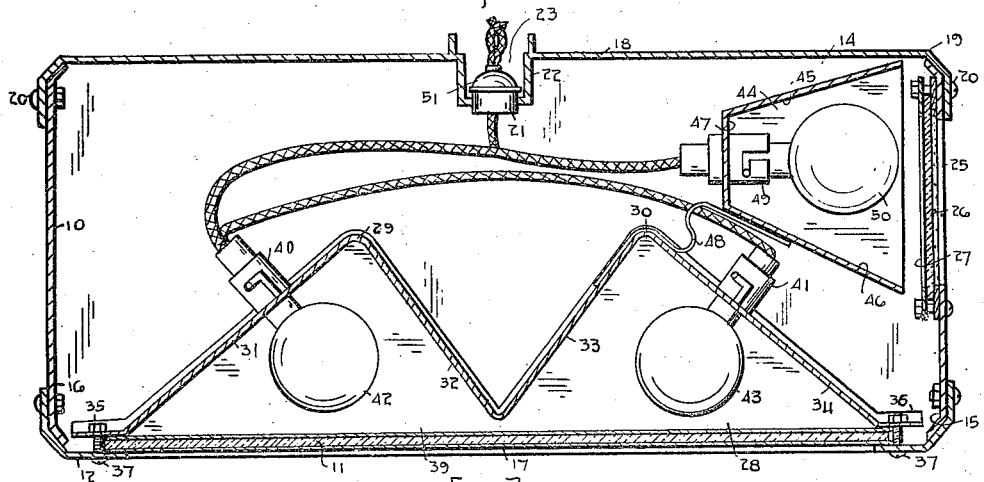
Figure 2 is an enlarged sectional plan view of the interior arrangement of the light casing.
Figure 4:
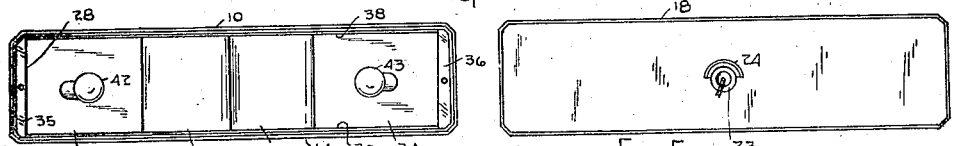
Figure 4 is a front elevation of the light.
Figure 5:
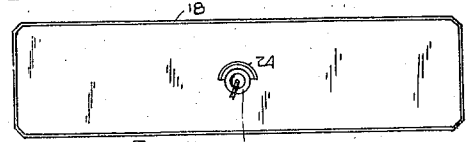
Figure 5 is a rear elevation of the light casing showing the connection.
Figure 3:
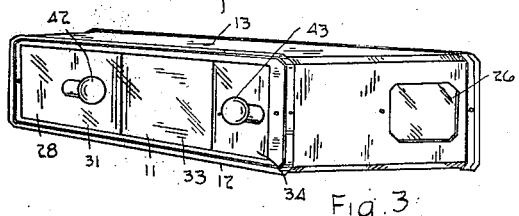
Figure 3 is a perspective detail of the light.

Referring to the drawings, the casing 10 is made of an oblong shape longitudinally and transversely. This casing is closed at the front by the lens 11, which is of similar shape to said casing and mounted in the frame 12, the latter forming a flanged rim fitting over the top 13, the bottom 14 and the ends 15 and 16 being screwed to the latter against the packing 17.

The back 18 is of similar shape to the rim or frame 12 and is flanged to fit over the casing 10, the complete casing with front and back having the bevelled corners 19, said back being secured by the screws 20 and packed if found desirable.

The plug socket 21 is securely held by the wall 22 of the recess 23 in the back 18 and said recess is protected by the shade 24 extending from the back wall above the recess.

The end 15 is formed with the squared opening 25, which is closed by the lens 26 mounted in the frame 27 secured to said end wall 15 forming a light opening adjacent to the back 18 and adapted to illumine the running board and the side of the car.

The lamp casing 28 is formed of the double V-shaped back walls 29 and 30, which are the reflectors 31, 32, 33 and 34 on the front side, the reflectors 32 and 33 being of a steeper pitch than the reflectors 31 and 34, thereby tending to concentrate the light within an area of a reasonable radius from the car without affecting the efficient distribution of the light to the front and rear of the car for passing purposes.

The wall sections or reflectors 31 and 34 are flanged outwardly at the ends 35 and 36 to attach the lamp casing to the frame 12. The partition or reflectors through their flanges 35 and 36 are rigidly secured by the screws 37 and the lamp casing 28 is completed by the top 38 and bottom 39. The lamp sockets 40 and 41 are secured in the reflector sections 31 and 34 beyond the centre towards the reflector sections 32 and 33, therefore the forward reflection is at two different angles and likewise the rearward reflection.

The lamps 42 and 43 are inserted at their plug ends in the sockets 40 and 41 and the latter are wired to the socket 21 in the rear portion of the casing 10. The main casing 10 is formed at one end to contain an inner lamp casing 44 having the reflector walls 45, and 46, and the back wall 47, these reflectors 45 and 46 reflecting the light through the lens 26 as provided in the main casing, said inner casing 44 being suitably closed in at the top and bottom and secured by the bracket 48 to the reflector wall sections 33 and 34. The lamp socket 49 is secured in the back 47 and supports the lamp 50 and is wired to the plug socket 21, which is connected through the plug 51 to the source of electric current.

Figure 7:
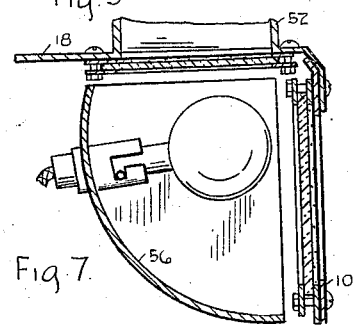
Figure 7 is a fragmentary plan view showing the end light casing in adding the ditch light.
Figure 6:
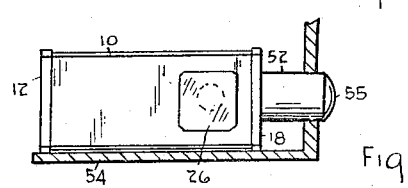
Figure 6 is a cross sectional view through the running board showing a modification of the invention in the addition of a ditch light.

In Figures 6 and 7 the modification shows an extension from the back 18, in lantern effect this being in the form of a barrel 52 reaching through the back plate 53 of the running board 54 and closed at the outer end by the lens 55 the reflector 56 as shown in Figure 7 necessarily being shaped for the double light openings, opening at the back and at the end of the main casing 10, thus accomplishing in the one device if required the passing light and the ditch light.

In the operation of this invention the current is turned on as darkness falls and the light is thrown forwardly to merge with the light rays of the headlight on the passing side, the two forward reflectors of the double V-shape accomplishing this light projection. The rearward reflection is from the other sections of the V's respectively, and these rays cross the forward rays and cause a splendid diffusion of light, so great as to light the whole area on the passing side and thereby neutralize the glare of the headlight to the satisfaction of the approaching vehicle and to the safety of both vehicles.

The side wall of the car is fully illumined by the end light showing through the lens 26, which not only lights the running board but the complete side wall.

The casing 10 is held to the running board adjacent to the front mudguard by suitable screws preferably inserted from the underside of said board and this brings the end light of the casing to the rear so that it shines on the passing side wall of the car, as well as on the foot board, as well as throwing a light behind the front lights.

In the modification illustrated in Figures 6 and 7 the description of the details clearly shows the light is thrown across to the ditch side under the car and may be directed to shine transversely and forwardly.

What I claim is:—

1. In a passing light for automobiles the combination with a board or plate, on the passing side, forming a step or support of a side lighting member having a rectangular form of casing closed at one side by an elongated lens parallel with the longitudinal direction of said steps and having a double angular reflector forming a plurality of side light pockets and a cup-shaped reflector forming an end light pocket, a socket in said cup-shaped reflector, a lamp in said socket, sockets in said side pockets, lamps in the latter sockets, a lens closing in said cup-shaped reflector in the end wall and electrical connections to the rear of said pockets in said casing.

2. A passing light for motor driven vehicles adapted to be mounted in a selected position and comprising a plurality of reflectors in a continuous reflecting surface extending outwardly towards the lens in its middle sections and from said middle sections extending in longer sections to the ends of the lens and forming light chambers spreading the light by the divergence of the directions of the rays, lamps in said chambers, a casing enclosing said reflectors and a lens in front of the latter.

3. In a passing light for a motor vehicle, a continuous reflector divided into a plurality of deflecting surfaces by means of bends extending each surface in a different direction in relation to the other reflecting surfaces and directing the rays of light forwardly and rearwardly in as many ways as there are reflecting surfaces and thereby diffusing the light in a wide radius, lamps in front of said reflectors, a casing enclosing the lamps and reflectors and a lens forming the side wall of the casing.

Signed at Montreal, Canada, this 12th day of January 1926.

EMILE ALEXANDRE JEANNOTTE.